United States Patent [19]

Gale

[11] Patent Number: 4,693,749
[45] Date of Patent: Sep. 15, 1987

[54] CEMENT REINFORCEMENT

[75] Inventor: David M. Gale, Wilmington, Del.

[73] Assignee: E. I. DuPont de Nemours and Company, Wilmington, Del.

[21] Appl. No.: 811,843

[22] Filed: Dec. 20, 1985

[51] Int. Cl.$^4$ ................................................. C04B 7/02
[52] U.S. Cl. ......................................... 106/99; 106/90; 428/395
[58] Field of Search .................... 106/90, 99; 428/395

[56] References Cited

U.S. PATENT DOCUMENTS

| | | | |
|---|---|---|---|
| 3,616,184 | 10/1971 | Katagiri et al. | 428/395 |
| 3,857,727 | 12/1974 | Benisek | 428/395 |
| 4,515,636 | 5/1985 | Carney et al. | 106/90 |

FOREIGN PATENT DOCUMENTS

| | | | |
|---|---|---|---|
| 55-62832 | 5/1980 | Japan | 106/90 |
| 60-260449 | 12/1985 | Japan . | |
| 84/03275 | 8/1984 | World Int. Prop. O. . | |

OTHER PUBLICATIONS

Processing of Composites with Titanate Coupling Agents–A Review (Polymer Eng. & Sci.), Dec. 1984, vol. 24, No. 18, pp. 1369–1382.
Polyfunctional Tyzor ® Organic Titanates, pp. 4, 5, 8, 17.

*Primary Examiner*—William R. Dixon, Jr.
*Assistant Examiner*—Steven Capella

[57] ABSTRACT

P-aramid fibers coated with certain titanate compounds is useful for strengthening cement products.

9 Claims, No Drawings

CEMENT REINFORCEMENT

BACKGROUND OF THE INVENTION

This invention relates to coated aramid fibers for cement reinforcement and to fiber-reinforced cement products incorporating such fibers. The combination of such coated aramid fibers with a pulp of oriented polyethylene fibrids is particularly useful for this purpose.

Substantial activity is being directed to developing reinforcing fibers for cement which replace the asbestos fibers formerly used. Cellulose fibers are being used for this purpose because of their capacity for dispersing in cement slurries to form webs in the manufacture of fiber-reinforced cement products. However, cellulose fibers are susceptible to swelling and degradation in the alkaline cement medium and this tends to reduce their performance as a reinforcement. Certain efforts have been made to overcome these deficiencies (see International Publication No. WO 84/03275).

The use of a pulp of oriented polyethylene fibrids having a birefringence of at least about 0.030 for cement reinforcement has been disclosed in a copending, coassigned U.S. Appl. Ser. No. 756,705. The addition thereto of staple fiber such as p-aramid fiber to increase flexural toughness of the cement composite is also disclosed in said copending application.

SUMMARY OF THE INVENTION

According to this invention, p-aramid fibers are made more suitable for cement reinforcement by coating them with from 0.25 to 40%, preferably from 0.25 to 10% by weight of an alkyl titanate, or a titanium chelate compound. The aramid fiber is poly-p-phenylene terephthalamide or a copolymer thereof. The invention also includes reinforced cement products containing from 0.1 to 6% by weight of the coated fiber. Preferably a pulp of oriented polyethylene fibrids is employed in combination with the coated p-aramid fiber for the cement reinforcement.

DETAILED DESCRIPTION OF THE INVENTION

Cement products reinforced with fibers of p-aramids have previously been suggested, however, there is a need for cement products of greater flexural strength and toughness. Applicant has found that this objective is reached by coating the p-aramid fiber with an alkyl titanate or a titanium chelate compound prior to incorporation in the cement.

The p-aramid fiber used in the present invention is formed of poly-p-phenyleneterephthalamide prepared from p-phenylene diamine and terephthalic acid or functional equivalents thereof. Better results have been obtained when a copolymer fiber prepared from p-phenylene diamine, terephthalic acid and 2,6-naphthoic acid or functional equivalents thereof is employed. In such copolymers there should be at least 75 mole % terephthalamide and up to 25 mole % of 2,6-naphthalamide units. Certain of the p-aramid fibers are commercially available such as Kevlar ® 49 Aramid fiber (E. I. du Pont de Nemours and Company).

As mentioned above, improved products are obtained by coating the p-aramid fiber with an alkyl titanate or a titanium chelate compound, preferably the latter. The lactic acid titanate chelate ammonium salt (also known as titanium lactate, ammonium salt) has been found to be particularly suitable for this purpose because it is miscible with water. It is commercially available as Tyzor ® LA (E. I. du Pont de Nemours and Company). Other titanates such as the triethanolamine chelate and tetraisopropyl titanate, commercially available as Tyzor ® TE and Tyzor TPT from E. I. du Pont de Nemours and Company are also useful. Alkyl (of up to 12 carbon atom length groups) titanates such as tetraisopropyl, tetrabutyl and tetrakis (2-ethylhexyl) titanates may be used but are less preferred. In practice from about 0.25 to 10% by weight of the chelate is coated on the p-aramid yarn from aqueous solution. The yarn is then dried and cut into staple lengths which for cement reinforcement purposes are generally in the range of from 4 to 20 mm. in length, preferably 5-12 mm. in length.

The production of cement composites is well known to those skilled in the art. Belgian Pat. No. 866129 shows a variety of techniques for such production. Basically the fibers are dispersed in water with Portland cement and mixed. Silica flour and newspulp are commonly added. The suspension may be deposited on a sieve and the water drained. From about 0.1 to 6% by weight of the coated p-aramid fiber are usefully employed to yield improved flexural strength and toughness. Marked improvement has been noted where a combination of the coated p-aramid fiber and a pulp of oriented polyethylene fibrids having a birefringence of at least 0.030 are used for reinforcement. The latter may be prepared as described in copending coassigned U.S. Application Ser. No. 756,705. From about 0.1 to 10% by weight of pulp may be employed. When using the pulp, the amount of coated p-aramid required for significant improvement is greatly reduced. Ratios of pulp to coated fiber of from 0.01 to 100 are satisfactory.

TEST PROCEDURE

Flexural Testing of Cement Composites

Fiber reinforced cement composites were evaluated by determining flexural toughness (also called work-to-break). The test is described in ASTM D-790. Flexural testing is used frequently by the asbestos cement industry as a measure of product performance for sheet products such as roofing tiles, building panels, etc. Cement samples (2.54 cm × 15.2 cm33 0.5 cm), prepared as described below were tested according to the above ASTM method in 3-point bending in an Instron test machine. A span of 7.6 cm was used in all cases. Test specimens are loaded to failure, and the maximum stress level determined graphically with a chart recorder. Flexural toughness is taken as the integrated area under the stress-strain curve until maximum stress is reached, measured in kJ/sq m (kilojoules per square meter). All samples, including controls were tested in the same way.

Flexural Strength Test of Cement Composites

The "flexural strength" sometimes called modulus of rupture is the point of maximum stress in the above test. It is reported in MPa (megapascals).

The following examples are intended to illustrate the present invention and are not to be construed as limiting.

EXAMPLES

Preparation of Coated Fibers For Examples I and II

An aqueous solution of the titanium/lactic acid complex, was diluted with one or nine parts of distilled water, depending on whether a high or low level of coating was desired. For runs A, B, C, F & G below, the yarn was a multifilament poly-p-phenyleneterephthalamide yarn having a tensile strength of about 400,000 lb/in$^2$ and a modulus of about 18 million lb/in$^2$. The filament denier was between about 1.7 and 2.5 dtex. For run E, the yarn was formed from a copolymer containing about 80 mole % of p-phenyleneterephthalamide units and about 20 mole % of p-phenylene-2,6-naphthalamide units. The yarns were coated by dipping them into the solutions or by passing the yarns over a slotted coating head at 50 yd/min and metering the solutions onto the yarn through a metering pump to produce the desired coating levels. Drying of the yarns was begun by passing them through a heated furnace, over heated rolls or both; furnace/roll temperatures of 100°–200° C. (usually 150° C.) were employed depending on the denier of the yarn and method of application. Conditions were set so as to evaporate most but not all of the solvent water. Final drying was accomplished by transferring the yarns to perforated bobbins and heating them in a vacuum oven at 110° C./20 mm until constant weight was reached (usually overnight). Coating levels were determined by weighing the yarns before and after coating or by calibration of the metering system. Dried yarns were cut into 6 mm staple before use in making cement tiles.

Procedure for Preparation of Cement Composites

For evaluation purposes, fiber reinforced cement composites are prepared which contain Portland cement, or mixtures of Portland cement and silica flour, together with various fibrous synthetic materials. Pulps are prepared by placing the unopened pulp (usually 8 gm) into a home blender with 1 l of water and blending on low speed for about 30–90 seconds (pulp all fluffed up). Opened pulps, thus prepared, are added to a plastic bucket containing about 4 l of water and the coated staple fibers. The mix is dispersed for 5 min with gentle agitation using a vibrating laboratory stirrer. Type 1 Portland cement (200 gm), or a mixture of cement and silica (200 gm total), dispersed into a slurry with 1 l of water, is then added. Flocculation is induced by addition of 4 ml of a 0.1% solution of flocculating agent (Separan A-273 manufactured by Dow Chemical Co.). The entire slurry is then cast into a sheet 33 cm × 33 cm and approximately 1.5–2 mm thick by pouring into a standard Deckle box paper making mold and dewatering. The resulting sheet is then folded into four layers, trimmed to 15.2 × 15.2 cm and pressed in a mold for 30 min at 1667 psi. Example I tiles are prepared for testing by pre-curing the molded composite (removed from the mold) one day at room temperature at about 100% relative humidity followed by curing in a steam autoclave (about 100 psi) at 160° for 6.5 hrs, whereas Example II tiles are cured for 28 days immersed in saturated lime water. The cured cement tiles are cut into strips 2.54 cm wide with a diamond saw. The strips are re-immersed in lime water and tested wet in 3-point bending to determine flexural toughness. Flexural strength values are given in MPa units and work-to-break toughness, that is the under the stress-strain curve to maximum stress, are given in KJ/sq m.

EXAMPLE I

Cement Reinforced with Coated Aramid Fibers

Portland cement (107.6 gm), silica flour (94.2 gm) and newspulp (8 gm) were employed in addition to the aramid fibers to prepare cement composites. Curing was at 160° for 6.5 hrs. Properties are indicated:

| PROPERTIES OF CEMENT TILES | | | | |
| --- | --- | --- | --- | --- |
| Run | Fiber WT (g) | Wt % Coating On Fiber | Flexural Strength | Flexural Toughness |
| A | 4.0 | 0 | 8.1 | 0.17 |
| B | 4.0 | 0.55 | 12.2 | 0.29 |
| C | 4.0 | 7.0 | 14.3 | 0.42 |
| D | None | — | 8.1 | 0.04 |
| E | 4.0 | 7.0 | 19.0 | 0.86 |

EXAMPLE II

Cement Composites Using Blends of Coated P-Aramid Fiber and Oriented Polyethylene Fibrid Pulp Using the methods described above, mixtures of coated yarn and oriented polyethylene fibrid pulp were combined with 200 gm of cement. Curing occurred at room temperature. Specimens were prepared and tested. Results are as follows:

| Run | WT % Fiber | WT % Pulp | % Coating on Fiber | Flexural Strength | Flexural Toughness |
| --- | --- | --- | --- | --- | --- |
| F | 0.24 | 3.66 | 7.0 | 20.7 | 0.53 |
| G | 0.48 | 3.40 | 7.0 | 22.7 | 0.37 |

EXAMPLE III

Poly-p-phenylene terephthalamide was cut into 6 mm staple. 8 gm samples were dipped into various coating compositions, removed, drained and kept in an oven at 60° C. overnight. Final sample weights were about 11 gm, indicating that substantial coating had been picked-up by the fiber. Using the methods described above for room temperature-cured composites, cement tiles were prepared from 4 gm of the coated staple, 8 gm of newspulp, and 200 gm of type 1 Portland cement. Testing was conducted as indicated above. This example establishes the usefulness of a variety of titanate-coated aramids for cement reinforcement. Average results are indicated:

| Coating Composition | Flexural Strength | Flexural Toughness |
| --- | --- | --- |
| Ammonium salt of lactic acid titanate chelate (50% in water) | 27.7 | 1.15 |
| Triethanolamine salt titanate chelate (80% in alcohol) | 28.9 | 1.33 |
| Tetraisopropyl titanate | 30.3 | 1.40 |

I claim:

1. A coated fiber useful for cement product reinforcement comprising fiber from poly-p-phenyleneterephthalamide or copolymers thereof consisting of at least 75 mole % of p-phenyleneterephthalamide units and up to 25 mol % of p-phenylene-2,6-naphthalamide units, coated with an alkyl titanate or a titanium chelate compound.

2. The fiber of claim 1 coated with a titanium chelate compound.

3. The fiber of claim 2 wherein the chelate is the ammounium salt of lactic acid titanate.

4. The fiber of claim 3 coated with about 0.25 to 10% by weight of the chelate.

5. A composition for reinforcement of cement products comprising a fiber from poly-p-phenyleneterephthalamide or copolymers thereof consisting of at least 75 mole % of p-phenyleneterephthalamide units and up to 25 mole % of p-phenylene-2,6-naphthalamide units, said fiber being coated with an alkyl titanate or a titanium chelate compound, and an amount of pulp of oriented polyethylene fibrids equal to from 0.01 to 100 times the amount of coated fiber on a weight basis.

6. A cement product reinforced with from 0.1 to 6% by weight of fiber from poly-p-phenyleneterephthalamide or copolymers thereof consisting of at least 75 mole % of p-phenyleneterephthalamide units and up to 25 mole % of p-phenylene-2,6-naphthalamide units, said fiber being coated with an alkyl titanate or a titanium chelate compound.

7. A cement product according to claim 6 additionally containing a pulp of oriented polyethylene fibrids in an amount equal to from 0.01 to 100 times the amount of coated fiber on a weight basis.

8. A cement product according to claim 6 wherein the fiber coating is the ammonium salt of lactic acid titanate.

9. A cement product according to claim 8 additionally containing a pulp of oriented polyethylene fibrids in an amount equal to from 0.01 to 100 times the amount of coated fiber on a weight basis.

* * * * *